(12) United States Patent
Boyle et al.

(10) Patent No.: US 10,163,213 B2
(45) Date of Patent: Dec. 25, 2018

(54) 3D POINT CLOUDS

(71) Applicant: CATHX RESEARCH LTD, Newhall (IE)

(72) Inventors: Adrian Boyle, Knavinstown (IE); Michael Flynn, Moatefield (IE)

(73) Assignee: CATHX RESEARCH LTD, Newhall (IE)

( * ) Notice: Subject to any disclaimer, the term of this patent is extended or adjusted under 35 U.S.C. 154(b) by 0 days.

(21) Appl. No.: 15/306,378

(22) PCT Filed: Apr. 24, 2015

(86) PCT No.: PCT/EP2015/058990
§ 371 (c)(1),
(2) Date: Oct. 24, 2016

(87) PCT Pub. No.: WO2015/162280
PCT Pub. Date: Oct. 29, 2015

(65) Prior Publication Data
US 2017/0046845 A1 Feb. 16, 2017

(30) Foreign Application Priority Data
Apr. 24, 2014 (GB) .................................. 1407270.6

(51) Int. Cl.
*G06T 7/00* (2017.01)
*G06T 7/521* (2017.01)
*G06T 7/73* (2017.01)

(52) U.S. Cl.
CPC ............ *G06T 7/0042* (2013.01); *G06T 7/521* (2017.01); *G06T 7/73* (2017.01); *G06T 2207/10024* (2013.01); *G06T 2207/10028* (2013.01)

(58) Field of Classification Search
CPC ............ G06T 7/50–7/596; G06T 7/73; H04N 2013/0081
See application file for complete search history.

(56) References Cited

U.S. PATENT DOCUMENTS 6,028,672 A * 2/2000 Geng .................. G01B 11/022
250/237 G
6,754,370 B1 * 6/2004 Hall-Holt ............... G01B 11/25
356/3

(Continued)

FOREIGN PATENT DOCUMENTS

WO 2010/094135 A1 8/2010

OTHER PUBLICATIONS

Bruno et al "experimentation of structured light and stereo vision for underwater 3d reconstruction" ISPRS Journal of photogrammetry and remote sensing 2011.*

(Continued)

*Primary Examiner* — Sean Motsinger
(74) *Attorney, Agent, or Firm* — Womble Bond Dickinson (US) LLP; John J. Penny, Jr.

(57) ABSTRACT

Provided is a method for generating a 3D point cloud and colour visualisation of an underwater scene, the point cloud comprising a set of (x, y, z) coordinates relating to points in the scene, the method operating in a system comprising at least one camera module, at least one structured light source, and a processing module, each of the at least one camera module being directed at the scene and having substantially the same overlapped field of view.

10 Claims, 7 Drawing Sheets

(56) References Cited

U.S. PATENT DOCUMENTS

| | | | |
|---|---|---|---|
| 2007/0090189 A1* | 4/2007 | Suwa | G01B 11/2522 235/454 |
| 2012/0099402 A1 | 4/2012 | Debrunner et al. | |
| 2012/0113229 A1* | 5/2012 | Hassebrook | H04N 13/025 348/47 |
| 2012/0169841 A1* | 7/2012 | Chemali | E21B 47/0002 348/36 |
| 2012/0182391 A1* | 7/2012 | Gallagher | H04N 13/021 348/46 |
| 2013/0010079 A1* | 1/2013 | Zhang | H04N 13/0207 348/47 |
| 2013/0107010 A1* | 5/2013 | Hoiem | G06T 7/0081 348/47 |
| 2013/0215235 A1* | 8/2013 | Russell | H04N 13/0203 348/47 |
| 2014/0267623 A1* | 9/2014 | Bridges | G01S 17/003 348/46 |
| 2014/0285655 A1* | 9/2014 | Son | G01B 11/24 348/81 |
| 2014/0286566 A1* | 9/2014 | Rhoads | H04N 13/0275 382/154 |
| 2014/0307057 A1* | 10/2014 | Kang | H04N 5/33 348/47 |
| 2015/0310663 A1* | 10/2015 | Yamasaki | H04N 9/31 348/136 |
| 2016/0249036 A1* | 8/2016 | Son | H04N 13/0253 |
| 2016/0350929 A1* | 12/2016 | Tubic | G01B 11/25 |
| 2017/0046845 A1* | 2/2017 | Boyle | G06T 7/0042 |
| 2017/0193673 A1* | 7/2017 | Heidemann | G06T 7/593 |
| 2017/0230639 A1* | 8/2017 | Laffargue | H04N 13/0271 |

OTHER PUBLICATIONS

Bonin, F. et al., "Imaging systems for advanced underwater vehicles," J. Maritime Research, 2011, v8, pp. 65-68.

Bruno, F., et al., "Experimentation of structured light and stereo vision for underwater 3D reconstruction," ISPRS Journal of Photogrammetry and Remote Sensing, 2011, v. 66, pp. 508-518.

Tetlow, S. et al., "Three-dimensional measurement of underwater work sites using structured laser light," Measurement Science and Technol., IOP, 1999, v. 10, pp. 1162-1167.

International Search Report and Written Opinion for Application No. PCT/EP2015/058990, dated Aug. 18, 2015.

* cited by examiner

3D POINT CLOUDS

The present application claims priority under 35 U.S.C. § 119 to European Patent Application No. 1407270.6 filed in Great Britain on Apr. 24, 2014, and under 35 U.S.C. § 365 to PCT/EP2015/058990, filed on Apr. 24, 2015, the disclosures of which are incorporated herein by reference.

This invention relates to methods for obtaining 3D point clouds as part of a sub-sea survey.

BACKGROUND

Underwater surveying and inspection is a significant component of many marine and oceanographic sciences and industries. Considerable costs are incurred in surveying and inspection of artificial structures such as ship hulls; oil and cable pipelines; and oil rigs including associated submerged platforms and risers. There is great demand to improve the efficiency and effectiveness and reduce the costs of these surveys. The growing development of deep sea oil drilling platforms and the necessity to inspect and maintain them is likely to push the demand for inspection services even further. Optical inspection, either by human observation or human analysis of video or photographic data, is required in order to provide the necessary resolution to determine their health and status.

Conventionally the majority of survey and inspection work would have been the preserve of divers but with the increasing demand to access hazardous environments and the continuing requirement by industry to reduce costs, the use of divers is becoming less common and their place being taken by unmanned underwater devices such as Remotely Operated Vehicles (ROV), Autonomous Underwater Vehicles (AUV) and underwater sentries.

ROVs and AUVs are multipurpose platforms and can provide a means to access more remote and hostile environments. They can remain in position for considerable periods while recording and measuring the characteristics of underwater scenes with higher accuracy and repeatability.

An underwater sentry is not mobile and may be fully autonomous or remotely operated. An autonomous sentry may have local power and data storage while a remote operated unit may have external power.

Both ROVs and AUVs are typically launched from a ship but while the ROV maintain constant contact with the launch vessel through an umbilical tether, the AUV is independent and may move entirely of its own accord through a pre-programmed route sequence.

The ROV tether houses data, control and power cables and can be piloted from its launch vessel to proceed to locations and commence surveying or inspection duties. The ROV relays video data to its operator through the tether to allow navigation of the ROV along a desired path or to a desired target.

Obtaining 3D data of an underwater scene can be an important part of carrying out a survey. Known methods including time of flight measurements and laser line scanning may require expensive or complex technology and may suffer from slow acquisition times and or deployment complications.

It is an object of the present disclosure to overcome at least some of the above-mentioned disadvantages. In particular, it is an objective of the present invention to allow high speed 3D real time point cloud generation at high resolution typical on camera sensors. By high speed, we mean on a moving underwater vehicle.

BRIEF SUMMARY OF THE DISCLOSURE

According to an aspect of the disclosure, there is provided a method for generating a 3D point cloud of an underwater scene, the point cloud comprising a set of (x, y, z) coordinates relating to points in the scene, the method operating in a system comprising at least one camera module, at least one structured light source, and a processing module, the at least one camera module being directed at the scene and having substantially the same overlapped field of view; the method comprising: the at least one structured light source projecting a two-dimensional array of points onto the scene; each of the at least one camera module capturing an image of the projected array in the scene from first and second positions, such that there is a first point image and second point image; analysing the images to identify the location of each projected point within each point image; for each projected point in the captured point images, correlating the location of the point between the first and second point images to calculate the distance to the point from the at least one camera module; storing the distance and location of the point; adjusting the position of the two-dimensional array of points in the scene and repeating the above steps, thereby forming a 3D point cloud.

The system may comprise a white light source, and the method may further comprise: projecting the white light on to the scene in sequence following a structured light acquisition; each camera acquiring a white light image; and combining the 3D point cloud and white light images to provide a 3D colour visualisation of the scene.

By adding a white light source in sequence with the structured light in a sequential manner it is possible to combine the 3D point cloud data set and white light images set to render a 3D visualisation of the scene. This may be achieved in a manner such as point cloud painting where the location of the white light imaging location is known accurately with respect to the 3D point cloud.

Optionally, the system further comprises a plurality of light sources controllable to provide a plurality of illumination profiles; and the method comprises: illuminating the scene according to a while light profile; each camera module simultaneously capturing an image of the illuminated scene, such that there is a first scene image and second scene image; using machine vision to analyse the images to identify at least one feature within each scene image; comparing features between scene images to identify features that appear in both scene images; identifying the locations of points in features that appear in both scene images; correlating the location of the features points between the first and second scene images to calculate the distance to the feature points from a camera module; and storing the distance and location of the feature points.

Where the white light images are shot in sequence with structured light such as a grid, then this system may use the grid to speed up the feature recognition in the white light images. This is achieved by guiding the system to known collocated points. In effect this is structured light guided photogrammetry.

The at least one camera module may comprise a single camera, the method comprising positioning the single camera at a first location, acquiring images and position data at the first location with the camera, followed by moving the single camera to a second location, and acquiring images and position data at the second location with the camera. In the situation where the structured light remains in a fixed position, this configuration is effectively equivalent to two cameras.

The at least one camera module may comprise a pair of cameras. The pair of cameras may be separated by a distance greater than inter-ocular distance. Each of the pair of cameras may simultaneously capture an image of the projected array in the scene from the first and second positions. The pair of cameras may be separated by a distance in the region of 1 m to 2 m. Optionally, the two-dimensional array of points comprises a grid or checkerboard.

According to another aspect of the disclosure, there is provided a method of generating a 3D point cloud of an underwater scene, the point cloud comprising a set of three variable Cartesian coordinates relating to surface points in the scene, the coordinates being defined in relation to an origin, the method operating in a system comprising a time-of-flight laser ranging device, a beam adjustor, a camera module and a controller, the method comprising: the time-of-flight laser ranging device measuring the range to a point in the scene by projecting a laser beam onto that point; recording a range time stamp associated with that range measurement; the camera module capturing an image of the laser beam projected onto the scene, recording an image time stamp associated with the captured image; analysing the image to identify a horizontal and vertical coordinate of the laser beam in the image, combining the range measurement with horizontal and vertical coordinates having an image time stamp that matches the range time stamp of the range measurement so as to form a three variable Cartesian coordinate; and adjusting the location of the projected laser beam; and repeating the steps above.

Optionally, the steps of measuring the range, recording a range time stamp, capturing an image and recording an image time stamp are repeated approximately 100 times per second. The steps may be repeated in the region of 1000 times per second. The methods of the present disclosure may be configured to be performed in one of pipelines, subsea structures, horizontal flowlines, vertical risers, and subsea production and processing equipment. Further, the method may be configured to be performed for an internal well bore survey at high speed using full resolution single or dual sensors, laser and pulsed lighting.

BRIEF DESCRIPTION OF THE DRAWINGS

Embodiments of the invention are further described hereinafter with reference to the accompanying drawings, in which.

DETAILED DESCRIPTION

Overview

Figure 1:
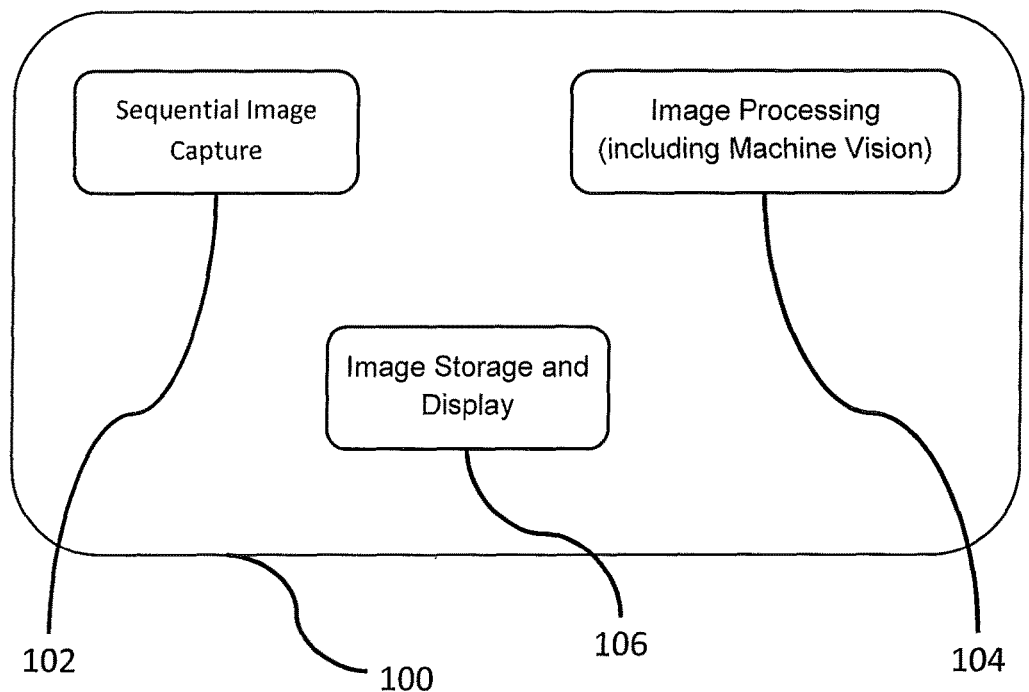
FIG. 1 is a block diagram of an underwater survey system in which the present invention operates.

The present disclosure relates to systems and methods for use in carrying out underwater surveys, in particular those carried out by Remotely Operated Vehicles (ROVs), Autonomous Underwater Vehicles (AUVs) and fixed underwater sentries. The systems and methods are particularly useful for surveying manmade sub-sea structures used in the oil and gas industry, for example pipelines, flow lines, well-heads, and risers. The overall disclosure comprises a method for capturing high quality survey images, including additional information not present in standard images such as range and scale.

The systems and methods may further comprise techniques to manage and optimise the survey data obtained, and to present it to a user in an augmented manner. The disclosure further relates to systems and methods for generating 3D point clouds as part of sub-sea surveys.

The systems and methods may implement an integration of image capture, telemetry, data management and their combined display in augmented output images of the survey scene. An augmented output image is an image including data from at least two images captured of substantially the same scene using different illumination profiles. The augmented output image may include image data from both images, for example, edge date extracted from one image and overlaid on another image. The augmented output image may include non-image data from one or more of the images captured, for example the range from the camera to an object or point in the scene, or the dimensions of an object in the image. The additional information in an augmented output image may be displayed in the image, or may be linked to the image and available to the user to view on selection, for example dimensions may be available in this manner. The augmented output images may be viewed as a video stream or combined to form an overall view of the surveyed area. Furthermore, the systems and methods may provide an enhancement that allows structures, objects and features of interest within each scene to be highlighted and overlaid with relevant information. This may be further coupled with measurement and object identification methods.

For capturing the images, the disclosure provides systems and methods for capturing sequential images of substantially the same scene to form a single frame, wherein a plurality of images of the scene are captured, each illuminated using a different light profile. The light profiles may be provided by the lighting module on the vehicle or sentry and may include white light, UV light, coloured light, structured light for use in ranging and dimensioning, lights of different polarisations, lights in different positions relative to the camera, lights with different beam widths and so on. The light profiles may also include ambient light not generated by the lighting module, for example light available from the surface or light from external light sources such as those that may in place near a well-head or the like.

As mentioned above, images for a single frame may be captured in batches sequentially so that different images of the same field of view may be captured. These batch images may be combined to provide one augmented output image or frame. This technique may be referred to as sequential imaging. In some cases, the batches may be used to fine tune the parameters for the later images in the batch or in subsequent batches. Sequential illumination from red, green and blue semiconductor light sources which are strobed on and off and matched with the exposure time of the camera module so as to acquire three monochromatic images which can then be combined to produce a faithful colour image.

Measurement data is acquired and processed to generate accurate models or representations of the scene and the structures within it, and which is then integrated with the images of the same scene to provide an augmented inspection and survey environment for a user.

In particular, laser based range and triangulation techniques are coupled with the illumination and scene view capture techniques to generate quasi-CAD data that can be superimposed on the images to highlight dimensions and positioning of salient features of the scene under view.

Machine vision techniques play an important role in the overall system, allowing for image or feature enhancement; feature and object extraction, pattern matching and so on. In particular, machine vision techniques facilitate high-speed photogrammetry and 3D reconstruction in an automated way.

The disclosure also comprises systems and methods for gathering range and dimensional information in underwater surveys, which is incorporated into the method of sequential imaging outlined above. In the system, the lighting module may include at least one reference projection laser source which is adapted to generate a structured light beam, for example a laser line, a pair of laser lines, or a 2 dimensional array of points such as a grid. The dimensioning method may comprises capturing an image of the scene when illuminated by white light, which image will form the base for the augmented output image.

The white light image may be referred to as a scene image. Next an image may be captured with the all other light sources of the lighting module turned off and the reference projection laser source turned on, such that it is projecting the desired structured light beam. This image shows the position of the reference beam within the field of view. Processing of the captured image in software using machine vision techniques provides range and scale information for the white light image which may be utilised to generate dimensional data for objects recorded in the field of view.

The object size, shape and other features may be stored along with the distance to the object. By tracking the object between images, the "flow" or velocity of the motion may be calculated. This technique is described in WO2014/060564, WO2014/063999, and WO2014/060562 for the purpose of forming 2D and 3D mosaic images.

By using multiple lighting options, "good" correlation points, and lighting, accurate and repeatable object classification may be provided.

This "optical flow" measurement may also provide vectors or position data which may be used similar to telemetry data to create further likely search regions for other objects with features in in 2D (e.g. edges) or 3D space (e.g. height contours).

In one example, range to a scene may be estimated using a structured light source aligned parallel to the camera module and a fixed distance from the camera module. The structured light source may be adapted to project a single line beam, preferably a vertical beam if the structured light source is located to either side of the camera, onto the scene. An image is captured of the line beam, and that image may be analysed to detect the horizontal distance, in pixels, from the vertical centreline of the image to the laser line. This distance may then be compared with the known horizontal distance between the centre of the lens of the camera module and the structured light beam. Then, based on the known magnification of the image caused by the lens, the distance to the beam projected onto the beam may be calculated.

Additionally, the structured reference beam may provide information on range to the objects in the field of view and the attitude of the survey vehicle relative to the seabed. Structured light in the form of one or more spots, lines or grids generated by a Diffractive Optical Element (DOE), Powell Lens, scanning galvanometer or the like may be used. Typically, blue lasers are used as reference projection laser sources however green lasers may be used as well as or instead of blue.

Furthermore, for a system comprising a dual camera and laser line, grid or structured light beams within a sequential imaging system, it is possible to perform metrology or inspection on a large area in 3D space in an uncontrolled environment, using 3D reconstruction and recalibration of lens focus, magnification and angle.

Capturing augmented survey images to provide a still or video output is one aspect of the disclosure. A further function of the system comprises combining images into a single composite image and subsequently allowing a user to navigate through them, identifying features, while minimising the data load required. Processing of the image and scale data can take place in real time and the live video stream may be overlaid with information regarding the range to the objects within the field of view and their dimensions. In particular the 3D data, object data and other metadata that is acquired can be made available to the viewer overlaid on, or linked to the survey stream. The systems and methods can identify features or objects of interest within the image stream based on a known library, as described in relation to processing survey data of an underwater scene. When a specific object has been identified, additional metadata may be made available such as a CAD data including dimensions, maintenance records, installation date, manufacturer and the like. The provision of CAD dimension data enables the outline of the component to be superimposed in the frame. Certain metadata may not be available to an AUV during the survey, but may be included at a later stage once the AUV has access to the relevant data libraries.

In addition, telemetry based metadata, such as location, may also be incorporated into the augmented output image. For example, telemetry data provides geographical or time based data. Geographical data identifies where the image was acquired in space. Time-based data identifies the sequence in which the image was acquired relative to other images. Telemetry data can also provide likely locations on where objects detected in one image are likely to appear in a second image, thereby reducing the search area required to position once image relative to another with accuracy.

Referring to FIG. 1, there is shown a block diagram of the overall system 100 as described herein. The overall system 100 comprises a sequential imaging module 102, an image processing module 104 which includes a machine vision function, and an image storage and display module 106. In use, images are captured using sequential imaging, analysed and processed to from an augmented output image by the image processing module 104; and stored, managed and displayed by the image storage and display module 106.

Terminology

There is provided a below a brief discussion on some of the terminology that will be used in this description.

Throughout the specification, the term field of view will refer to the area viewed or captured by a camera at a given instant.

Light profile refers to a set of characteristics of the light emitted by the lighting module, the characteristics including wavelength, polarisation, beam shape, coherency, power level, position of a light source relative to the camera, angle of beam relative to the camera orientation and so on and the like. A light profile may be provided by way of one of more light sources, wherein each light source belongs to a specific light class. For example, a white light illumination profile may be provided by four individual white light light sources, which belong to the white light class.

Exposure determines how long a system spends acquiring a single frame and its maximum value is constrained by the frame rate. In conventional imaging systems, this is usually fixed. Normally it is 1/frame rate for "full exposure" frames, so a frame rate of 50 frames per second would result in a full frame exposure of 20 ms. However, partial frame exposures are also possible in which case the exposure time may be shorter, while the frame rate is held constant.

Frame delay is the time between a clock event that signals a frame is to be acquired and the actual commencement of the acquisition. In conventional imaging systems this is generally not relevant.

A trigger event is may be defined by the internal clock of the camera system; may be generated by an external event; or may be generated in order to meet a specific requirement in terms of time between images.

The integration time of a detector is conventionally the time over which it measures the response to a stimulus to make an estimate of the magnitude of the stimulus. In the case of a camera it is normally the exposure time. However certain cameras have limited ability to reduce their exposure times to much less than several tens of microseconds. Light sources such as LEDs and lasers can be made to pulse with pulse widths of substantially less than a microsecond. In a situation where a camera with a minimum exposure time of 50 microseconds records a light pulse of 1 microsecond in duration, the effective integration time is only 1 microsecond and 98% shorter than the minimum exposure time that can be configured on the camera.

The light pulse width is the width of a pulse of light in seconds. The pulse of light may be longer than or shorter than the exposure.

The term light pulse delay refers to the delay time between the trigger event and the start of the light pulse.

The power of light within a given pulse is controlled by the control module and can be modulated between zero and the maximum power level possible. For an imaging system with well corrected optics, the power received by the sensor and the noise level of the sensor determine the image quality. Additionally, environmental factors such as scattering, absorption or reflection from an object, which can impair image acquisition, may require that the power is changed. Furthermore, within an image, parts of objects within a scene may reflect more light than others and power control over multiple frames may allow control of this reflection, thereby enabling the dynamic range of the sensor to be effectively increased. Potentially, superposition of multiple images through addition and subtraction of parts of each image can be used to allow this.

High dynamic range, contrast enhancement and tone mapping techniques can be used to compensate for subsea imaging challenges such as low visibility. High dynamic range images are created by superimposing multiple low dynamic range images, and can provide single augmented output images with details that are not evident in conventional subsea imaging.

The wavelength range of light visible to the human eye is between 400 nm blue and 700 nm red. Typically, camera systems operate in a similar range however, it is not intended that the system and methods disclosed herein be limited to human visible wavelengths only; as such the camera module may be generally used with wavelengths up to 900 nm in the near infra-red, while the range can be extended into the UV region of the spectrum with appropriate phosphors.

The term structured light beam may be understood to refer to beam having a defined shape, structure, arrangement, or configuration. It does not include light that provides generally wide illumination. Similarly, a 'structured light source' may be understood to refer to a light source adapted to generate such a beam. Typically, a structured light beam is derived from a laser, but may be derived in other ways.

Sequential Imaging

Figure 2:
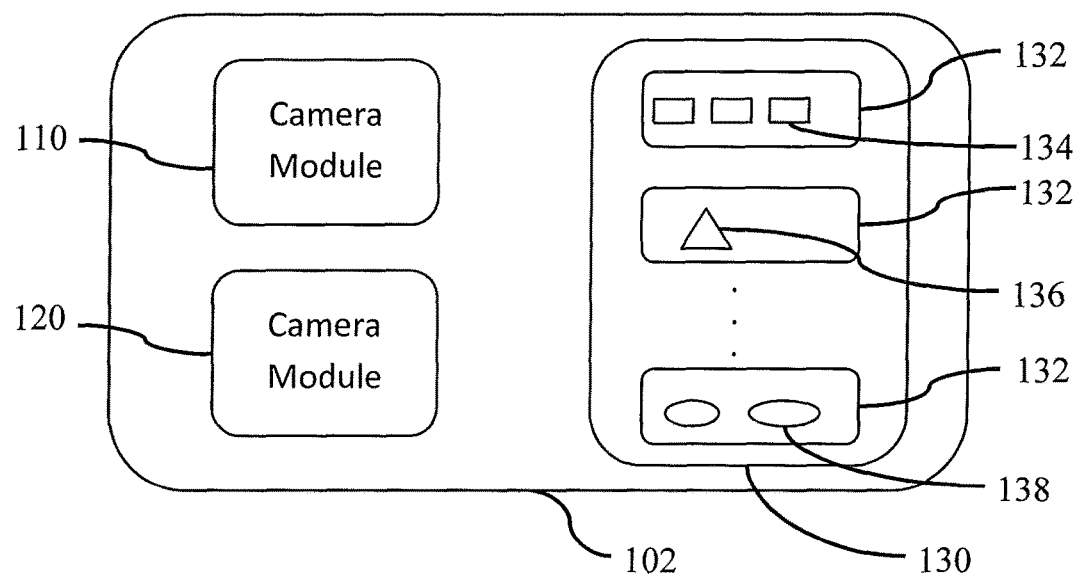
FIG. 2 is a block diagram of a sequential imaging module according to the disclosure.

Certain prior art sub-sea survey systems provide the user with a video output for review by an ROV pilot to allow him to navigate the vehicle. As such, the present system may be adapted to also provide a video output. Referring to FIG. 2, there is shown a block diagram of the sequential imaging module 102. The sequential imaging module may comprise a lighting module 130, a first camera module 110 and a second camera module 120. The lighting module 110 may comprise a plurality of light classes 132, each light class having one or more light sources 134, 136, 138. Various light profiles may be provided by activating certain light classes, or certain sources within a light class. A certain light profile may comprise no contribution from the light sources of the light module 130, such that imaging relies entirely on ambient light from other sources. The sequential imaging module may in general comprise light sources from three or four light classes, when intended for use in standard surveys. However, more light classes may be included if desired. An example sequential imaging module may be able to provide the following light profiles—white light, a blue laser line, UV light. The white light may be provided by light sources emitting white light or by coloured light sources combined to form white light. The power of the light sources may be variable. A UV light profile may be provided by one or more UV light sources.

Additional light profiles that could be provided include might include red, green, blue, green laser lines, a light source for emitting structured light which is offset from the angle of the camera sensor and so on.

The camera modules 110, 120 may be identical to each or may be different such that each is adapted for use with a particular light condition or profile.

Figure 3:
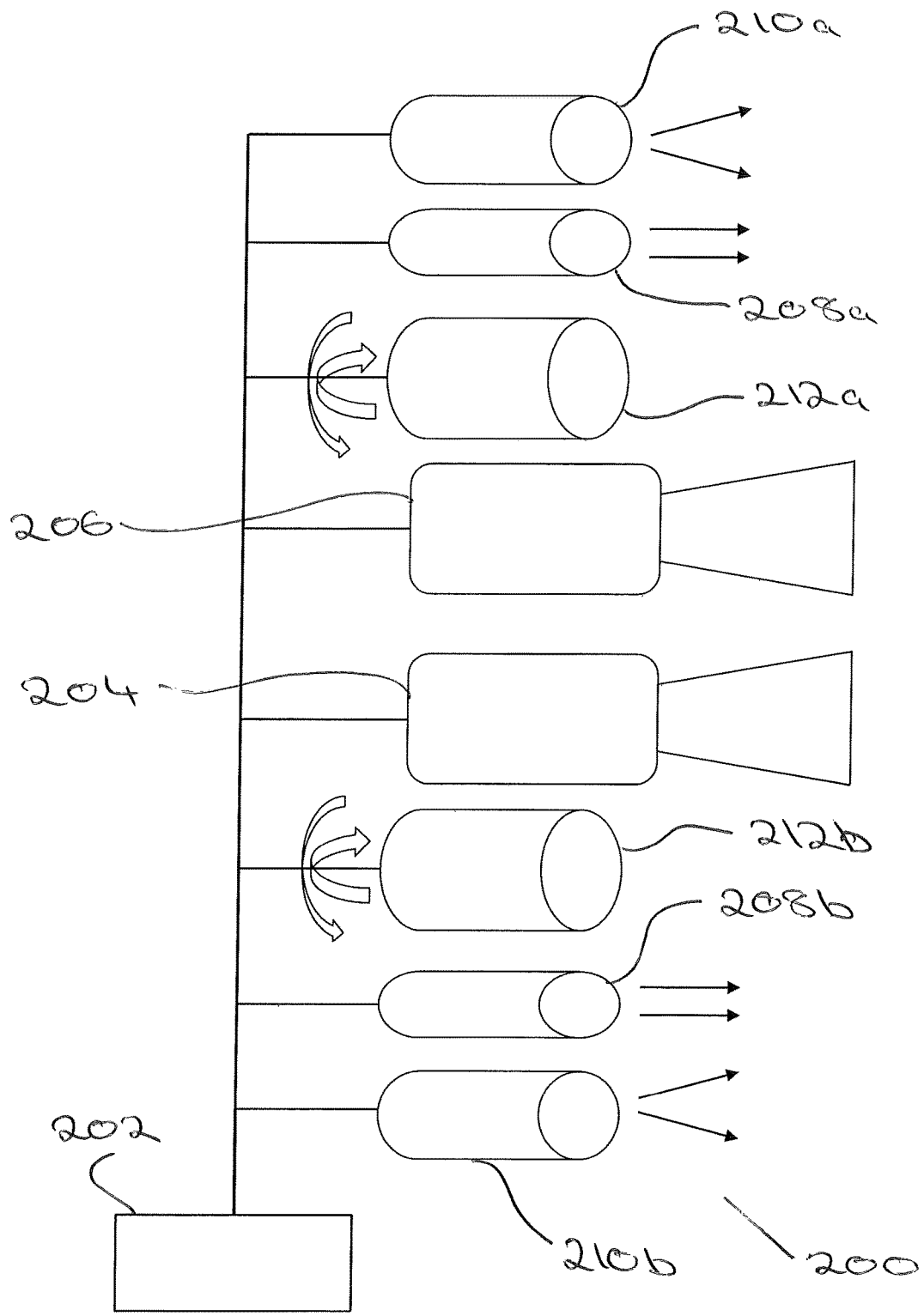
FIG. 3 is a diagrammatic representation of an exemplary system for use with the method of the disclosure.

Referring now to FIG. 3, there is shown a diagrammatic representation of an example under water imaging system, indicated generally by the reference numeral 200, for use with the methods disclosed herein. The system 200 comprises a control module 202 connected to a first camera module 204, a second camera module 206, and a plurality of light sources of different light classes. The light sources include a pair of narrow beam light sources 208a, 208b, a pair of wide beam light sources 210a, 210b and a pair of structured light sources 212a, 212b. For example, narrow beam spot lights 208 may be useful if imaging from longer range, and wide beam lights 210 may be useful for more close range imaging. Structured light beams are useful for deriving range and scale information. The ability to switch between lights or groups of lights according to their output angle, and therefore the area of illumination, is highly beneficial as it can enhance edges and highlight shadowing. In this way, features that would not be visible if illuminated according to a prior art halogen lamp may now we captured in images and identified in subsequent processing.

The light sources may be aligned parallel to the camera modules, may be at an angle to the camera modules, or their angle with respect to the camera may be variable. The camera modules 204, 206 and light sources 208, 210, 212 are synchronized by the control module 202 so that each time an image is acquired, a specific configuration and potentially differing configuration of light source parameters and camera module parameters is used. Light source parameters are chosen to provide a desired illumination profile.

It will be understood by the person skilled in the art that a number of configurations of such a system are possible for subsea imaging and robotic vision systems, suitable for use with the system and methods described.

Each light source 208, 210, 212 can have their polarization modified either through using polarizers (not shown), or waveplates, Babinet-Soleil compensators, Fresnel Rhombs or Pockel's cells, singly or in combination with each other.

From an imaging perspective, in order to obtain efficient and good quality images the imaging cone of a camera module, as defined by the focal length of the lens, should match closely with the light cone illuminating the scene in question. Potentially the imaging system could be of a variable focus in which case this cone can be varied and could allow a single light source to deliver the wide and narrow angle beams.

The cameras may be high resolution CMOS, sCMOS, EMCCD or ICCD cameras. Such cameras may have a resolution in excess of 1 Mega pixels and typically 4 Mega pixels or more. In addition, cooled cameras or low light cameras may be used.

In general, the sequential imaging method comprises, for each frame, illuminating the scene according to a certain illumination profile and capturing an image under that illumination profile, and then repeating for the next illumination profile and so on until all images required for the augmented output image have been captured. The illumination profile may be triggered before or after the camera exposure begins, or the actions may be triggered simultaneously. By pulsing light during the camera exposure time, the effective exposure time may be reduced.

3D Imaging

Two dimensional imaging of a scene may provide high levels of survey information; however depth-perception will be limited. It may therefore be useful to acquire depth or range information that may be useful in preparing a three dimensional representation of the scene under survey. One method of 3D imaging may involve the generation of a 3D point cloud corresponding to the surfaces in a scene. Such a point cloud may comprise a set of three-variable Cartesian coordinates, that is an (x, y, z) coordinate, with a coordinate obtained for a large number of surface points. In such a coordinate, the (x, y, z) values would represent the horizontal distance, vertical distance and range to a point from a defined origin, thus accurately defining the location in space of the point. The 3D point cloud may form the basis of many 3D CAD modelling techniques, modelling, visualisation and rendering.

Figure 6:
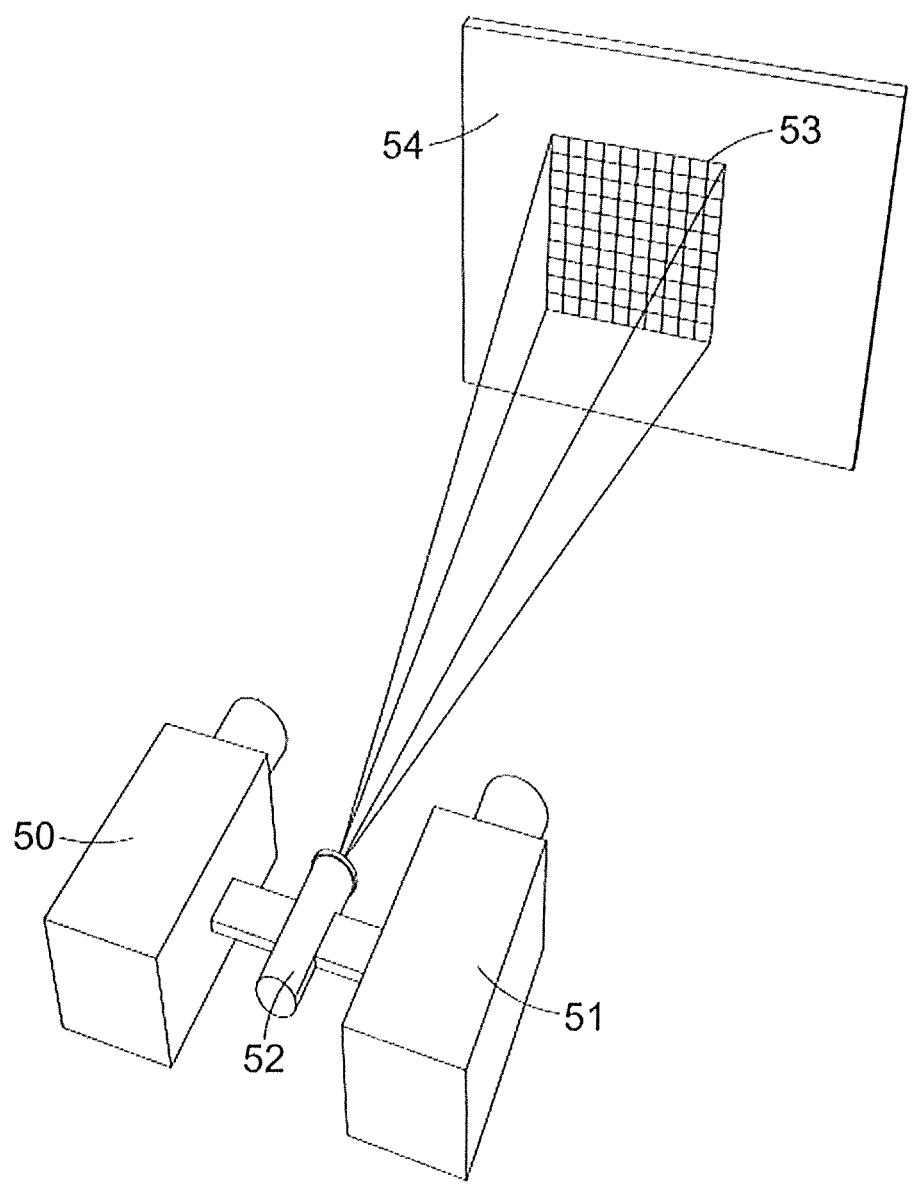
FIG. 6 is a diagrammatic representation of an exemplary system for use with the method of the disclosure.

Referring now to FIG. 6, there is shown a 3D imaging system comprising a pair of spaced apart camera modules, a left camera module 50 and a right camera module 51, having a grid-projecting reference projection structured light source 52 located between them. The camera modules 50, 51 record a scene 54 with a grid 53 projected thereon. Synthesis of the two resulting images through software then allows a 3D reconstruction of the scene.

Preferably the cameras are aligned to provide maximum overlap of their fields of view, so as to maximise the area for which the 3D point cloud data can be derived. The camera modules are preferably separated by a reasonably large distance to improve accuracy. A separation distance in the region of 1 m to 2 m may be useful. It is not necessary for the laser to be located in-between the camera modules as illustrated, the only requirement for the reference projection light source is that it projects at least one reference point, and preferably a 2D array of points onto the scene under examination. It will be understood that the method may use any shape, array or configuration of reference points. Using a 2D array of reference points allows a 3D point cloud to be built up for the area defined by the 2D array more efficiently.

The grid represents a two dimensional array of points, with each point derived by the crossing of two lines. Other shapes may be used to provide a suitable array of points, including for example an array of spots, a checkerboard pattern and so on.

In use, the 2D array of points is projected onto the scene, and the camera modules each capture the scene including the projected array. This results in a left point image from the left camera module and a right point image from the right camera module. The camera modules capture their images substantially simultaneously. As the laser beam is the only external illumination provided, the captured image may be largely black with only the shape of the 2D array as projected on the scene present in the image. As such, the images may be referred to as point images. By analysing each point image, it is possible to assign an x-y coordinate, relative to a local origin at the centre of that image, to each array point in the image. So for an array comprising twenty five points, analysis of the pair of point images will result in a set of twenty-five x-y coordinates from the left point image and a set of twenty-five x-y coordinates from the right point image. However, as both point images captured the same scene, the left twenty-five x-y coordinates correspond to the same points in space as the right twenty-five x-y coordinates. Therefore, by carrying out a correlation analysis on pairs of coordinates relating to the same point, and with reference to the know separation between the camera modules, it is possible to derive a full 3D Cartesian coordinate for each point, by calculating the point of intersection.

A scene origin point for the x-y-z data of the point cloud may be defined at a suitable location, for example, half way between the camera modules, with the (x, y, z) coordinates defined in relation to this origin.

The position of the 2D array of points is adjusted and the steps above repeated, to gain a further set of points in the point cloud. The beam projecting the 2D array of points may be stepped such that the entire field of view is covered over time, or only certain areas of interest may be analysed for generation of the point cloud.

As well as, or instead of, using the points defined by the reference projection beam, it is also possible to derive points of reference from the features in the scene. In this way, the entire scene is illuminated according to one or more suitable illumination profiles to highlight features, and each camera module captures a scene image. The scene images are analysed to extract features, and compared so as to match features in one image to the same feature in the other image. Suitable points may be chosen to correlate between the sets of images. The projected 2D array of points may be useful when surveying a scene with a low number of identifiable features.

Figure 4:
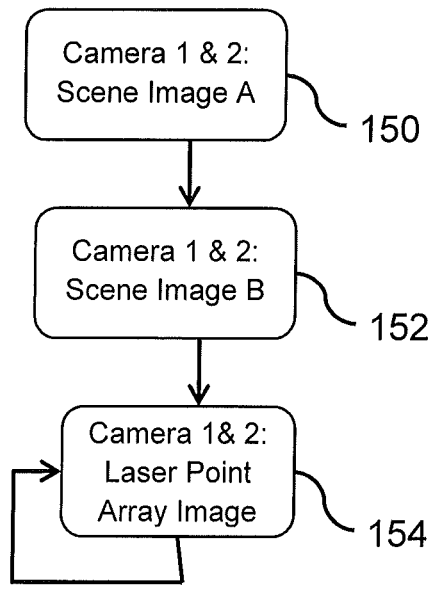
FIG. 4 is a flow chart of an example method of the disclosure.

Referring now to FIG. 4, a flow chart is shown showing an example sequential imaging path that may be used to generate a 3D point cloud of a scene. In step 150, a pair of simultaneous images of the scene are captured, wherein the scene is illuminated according to a first illumination profile, for example white light. In step 152, a further pair of simultaneous images of the scene are captured, wherein the scene is illuminated according to a second illumination profile, for example UV light or blue light. Next, in step 154 a pair of simultaneous images of the scene are captured, wherein the scene is illuminated with the 2D point array. This step is repeated, adjusting the location of the array of points each time, until sufficient data has been acquired. Each pair of images is analysed to extract matched reference points, and the 3D coordinate is derived from the pairs of reference points.

For dual camera and laser line, grid or structured light patterns within a sequential imaging system, 3D reconstruction and recalibration of lens focus, magnification and angle is possible.

Time of Flight 3D Point Cloud

In an alternative method of generating a 3D point cloud representing the surfaces in a scene, a time of flight laser ranging device may be used to obtain a range measurement to a particular point. In prior art point cloud methods, the beam of the time of flight laser ranging device may be scanned over the surfaces under examination to capture a representative set of points. In such cases the range coordinate is obtained from the time of flight measurement, while the horizontal and vertical distances and derived from the angle at which the beam is projected. In this way, the beam must be controlled very precisely to ensure that the (x, y) information is correct. Beam scanners having this level of precision may be complex and expensive.

Figure 5:
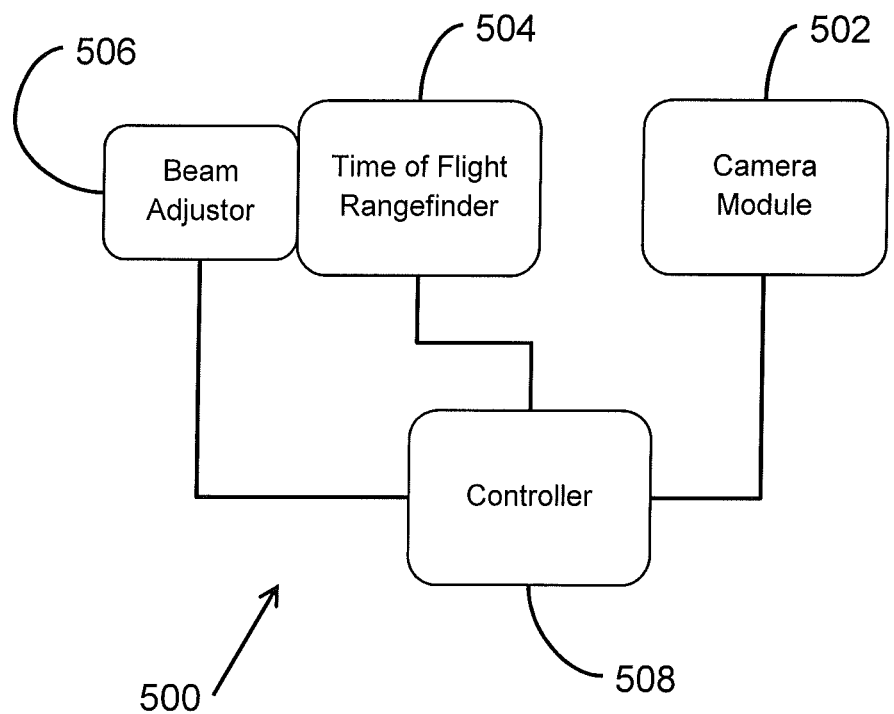
FIG. 5 is a block diagram of an example system used in the generation of 3D point cloud data.

Referring now to FIG. 5, there is shown a block diagram of an example system that may be used in a method of generating a 3D point cloud of an underwater scene. The system, indicated generally by the reference numeral 500, comprises a camera module 502 and a time-of-flight laser rangefinder 504. The time-of-flight laser range-finder 504 is connected to a beam adjustor 506 adapted to adjust the location of the beam such that it scans over the scene under examination in a discrete manner. The camera module 502, time-of-flight laser range-finder 504 and beam adjustor 506 are all connected to a controller which controls their operation. The time-of-flight laser range-finder 504 may be mounted close to the module and in a fixed position in reference thereto. Preferably, the time-of-flight laser range-finder 504 and camera module 502 are physically located close to each other. A scene origin point for the x-y-z data of the point cloud may be defined at a suitable location, for example, the camera lens, the aperture of the time-of-flight laser range-finder 504, or a point in between.

In use, the time-of-flight laser range-finder 504 projects a beam on to a surface and measures, using time of flight calculations, the distance to the point on which the beam is projected. The method may comprise a calibration step in order to evaluate the speed of light in the water at that location. This may be derived from a look-up table or measured empirically. A timestamp, referred to as a range timestamp may be recorded with each range measurement. The controller triggers the camera module to capture an image of scene including the beam projected by the time of flight device. A timestamp, referred to as an image timestamp, may be recorded for each captured image. As the laser beam from the time-of-flight device is the only external illumination provided, the captured image may be largely black with a single spot representing the beam. The image is analysed to measure the number of pixels from the dot to the horizontal and vertical centrelines of the captured image, that is, the x-y location of the dot in the image in relation to a local origin in the image. This coordinate may then be translated into an (x, y) coordinate in relation to the scene origin point.

Combining the range information with beam's (x-y) position, and using the well-characterised optics of the camera module in question, it is possible to derive an accurate (x, y, z) Cartesian coordinate for the point.

The beam adjustor adjusts the position of the beam and the steps are repeated to obtain a further co-ordinate. The maximum frame rate will depend on the sensitivity of the image sensor in the camera module, with a suitably sensitive sensor allowing frame rates of 1000 or several thousand frames per second. As the general location of the beam may be known from the beam adjustor, only a small area of the scene needs to be imaged. By using only a small portion of an image sensor, it is possible to achieve very high frame rates.

Depending on the processing power available, it may be possible to carry out all the steps to calculate the 3D point before the next point is analysed, however this is not necessary. To acquire sufficient data it is acceptable to acquire the range, image and data allowing the range data to be paired with the correct image for a single point before moving on to acquiring data for the next point. The pairing may be by way of the range timestamp and image timestamp for a single point before moving on to acquiring data for the next point, or may be carried out in a manner not dependent on timestamps. Once the data has been acquired, the image analysis and calculations may be carried out in parallel or subsequently. The range data may be matched to beam location data from the image by the matching the timestamps. It will be understood by the person skilled in the art that a number of methods of managing the timestamps may be envisaged. For example, the time-of-flight laser range-finder 504 and camera module 502 may apply their respective timestamps to the data. Additionally or alternatively, the controller may manage timestamps associated with the range and image data.

By deriving the x-y data from the captured image, the requirement for precision in the beam adjustor is lessened, allowing a less complex and less expensive device to be used. This may be particularly useful when carrying out a sub-sea survey using a survey vessel or sentry, since camera module capable of high levels of precision are already involved in the survey process and can be used to avoid adding extra complexity and expense.

It will be understood that the time of flight 3D point cloud method does not require the full feature set of the sequential imaging method and systems, in that it involves capturing a series of images using the same illumination source. However, it may be possible to include a portion of 3D point cloud generation into a sequential imaging survey, for example by assigning a portion of each frame period to capturing images of time of flight beams. 3D point cloud information of certain objects within scene may be a useful addition to the survey results. If used with a low-light sub-sea camera it may be possible to use the methods described herein over ranges of approximately 50 m to 60 m. A low light camera is a particularly sensitive camera having a sensitivity in the range of $10^{-3}$ to $10^{-6}$ lux.

Single Camera in Multiple Locations

In another embodiment, a single camera and laser profiling system, on a moving vehicle, may acquire images from two known positions. Image features in both images are detected through machine vision techniques to determine movement since the last image was acquired. Laser or structured light data can also be acquired. However, in this instance, the line position is not common to both images. Telemetry data may also be used to make an approximate estimate of the positions of new features to reduce the overall search area for the objects identified in the first image.

Figure 7:
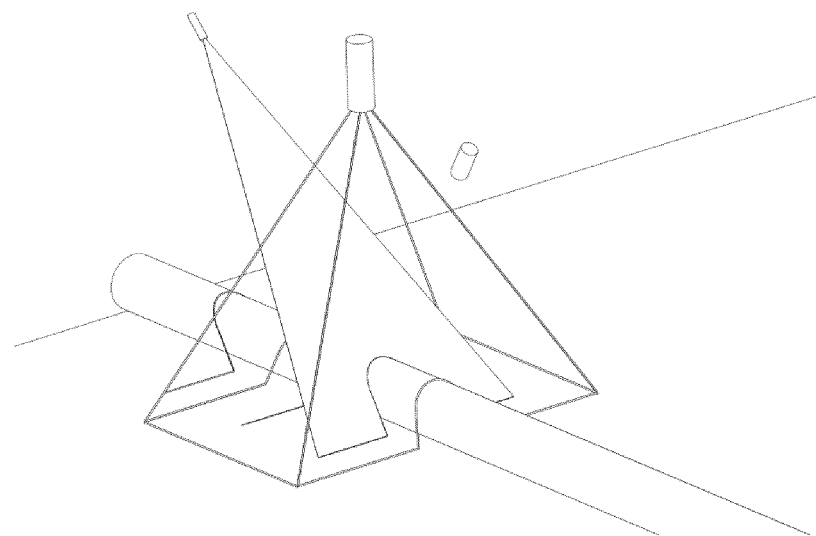
FIG. 7 illustrates a single camera, dual laser/lighting system, according to an embodiment of the disclosure.
Figure 8:
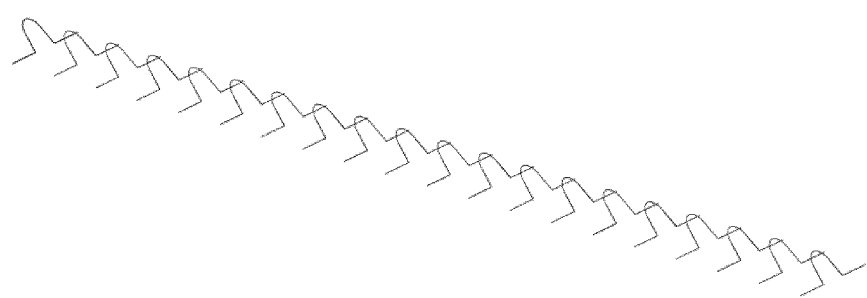
FIG. 8 illustrates a complete point cloud comprising 3D slices of data.

In this instance, correlation between the laser range and scale data for points within the image, the identified objects and the position data for which each image is acquired can also be used to create 3D point cloud sets.

Where a single camera, dual laser/lighting system, as shown in FIG. 7, is operated in a sequential mode both white light and laser 3D shape data may be captured. Typically the frequency of white light data is sufficient to provide sufficient overlap in the 2D images at a given vehicle speed. The laser may be shot at maximum system speed to ensure density of output 3D point cloud Where good telemetry/positional data is available at each image acquisition the 3D slices of data may be accurately positioned in space to form a complete point cloud as shown in FIG. 8.

Where good position data is not available, it may be necessary to integrate an (Inertial Measurement Unit (IMU) internally or externally to the camera. It is envisaged that this is a MEMS based device that provides a good track of motion in the sub-second intervals between successive images. As images are acquired on a moving platform the IMU tags each image with inertial data. This allows a dead reckoning positioning of the camera while it captures each image .After a small group of successive white light images and many laser images are shot, the white light is used to refine positions. This is done by utilising a combination of machine vision, optical flow and photogrammetric style techniques to track multiple points in these successive overlapping white light images to refine the relative positions. The combination of coarser dead reckoning position and good laser range data speeds up this position refinement process. Once the white light image capture positions are well known, the laser capture positions may be refined using IMU and the laser data can be formed in to a complete point cloud.

Figure 9:
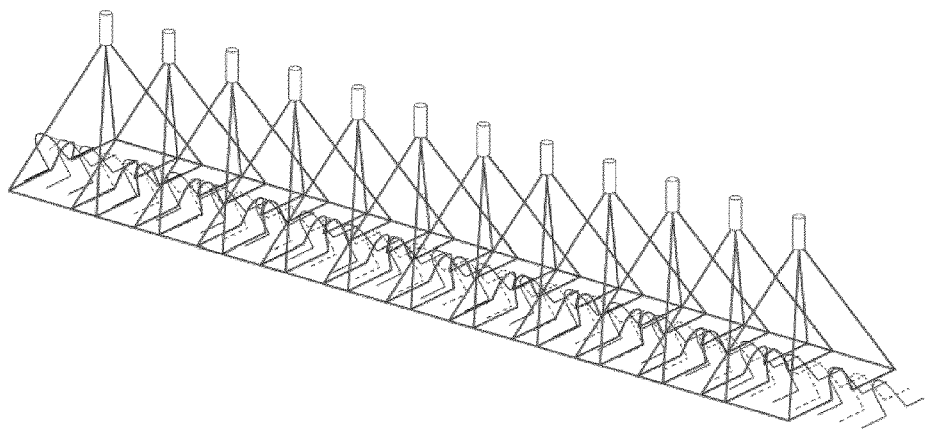
FIG. 9 illustrates a projection of images from their known position onto a co-located point cloud.
Figure 10:
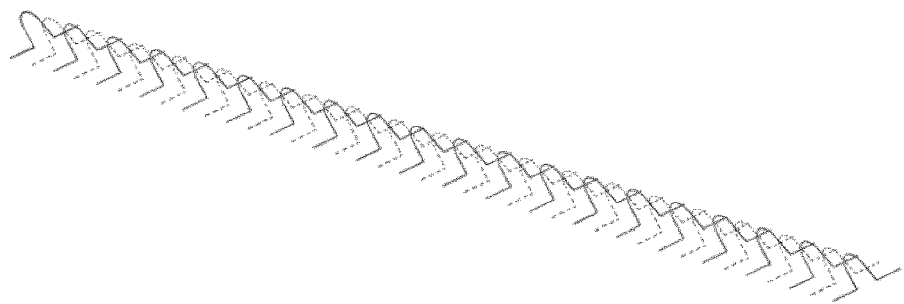
FIG. 10 illustrates how secondary points may be interpolated to capture more RGB data.
Figure 11:
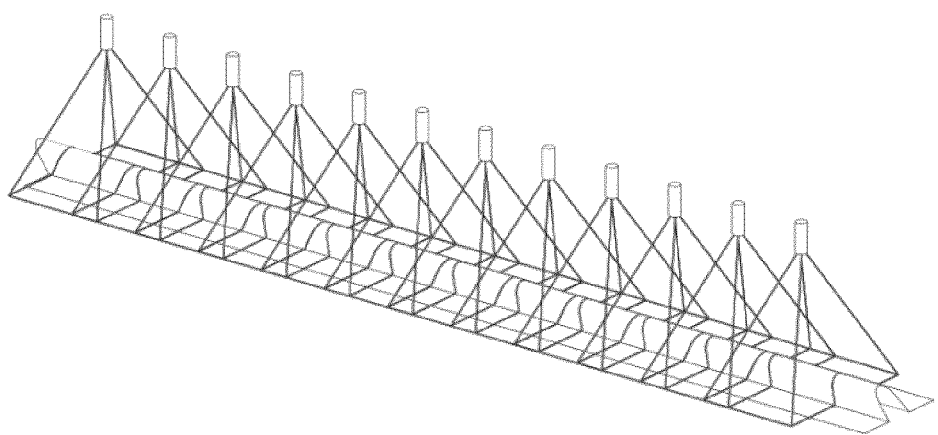
FIG. 11 illustrates how a surface may be fitted to a point cloud to capture all the captured images pixels.

The 3D laser and image sets may be processed into a 3D visualisation. This may be achieved using techniques such as point rendering. As illustrated in FIG. 9, this may be achieved by projecting images from their known position on to a co-located point cloud. Each point in the cloud acquires an RGB value. Where point clouds are not dense, techniques may be employed to improve the visualisation, such as interpolating secondary points to capture more RGB data, as shown in FIG. 10. Alternatively a surface may be fitted to the point cloud to capture all the captured images pixels, as illustrated in FIG. 11. Alternatively final stage photogrammetric techniques may be used to fill the gaps with already known 3D colour information used to greatly speed this process up.

An alternative approach on stable moving platforms is to directly colour the 3D points by tracking the corresponding point to pixel information in sequential images. Where a laser line image and white image are captured in the same camera in quick succession, each point on the line may be tracked to a coloured pixel or group of pixels in the white light image. This information is very adaptable to on camera implementation. Accordingly, high capture and processing speeds may be achievable. This is effectively a 3D colour line scanning process.

As mentioned above, a single camera with multiple lighting and laser sources on a single vehicle can be used to generate point cloud data and 3D colour visualisation of the scene.

In effect, a camera at a first position once takes one or more images, and when the vehicle moves to a second position a second set of images is acquired. In this manner, potentially n images sets may be acquired.

In the same way as described, features common to each image may be automatically detected and tracked within the images. These features may be used to accurately position the images relative to each other if telemetry/position data is low grade. Telemetry data may be used to coarsely position one image with respect to the other and therefore to also allow calculation of the potential area in which specific objects/features, lie thereby speeding up the process. Telemetry may be an internal IMU or an external device.

In this configuration, the laser or structured light may be captured in multiple frames between each image so is not common between the two images. Accurately positioning the bounding images allows refining of the laser data position and building of the PCD. Point cloud painting techniques may then be applied using the XYZ data and co located images to complete a 3D colour visualisation of the scene.

Where the system is on a stable platform the point cloud colour may be directly determined by measuring the shift between laser pixels and the corresponding RGB pixels when running in structured/white light image sequences. This is a real-time method of 3D colour optical visualisation. This method may be aided by optical flow techniques. However, range, scale and telemetry data from laser images may for example be acquired at points relative to specific objects in the white light image for example.

Synthetic Aperture Imaging

A result of applying the techniques described in WO2014/060564, WO2014/063999, and WO2014/060562, is that for a given object area, multiple images may be acquired. By accurate location and registration of these images, images may be added and noise reduced.

This is in effect synthetic aperture imaging. Likewise, by applying the techniques described here to one or more cameras to acquire images from multiple locations, overlap may be ensured between successive images, and noise may be reduced on the resulting 3D image.

In another embodiment, two sequential images, one laser and one white light may be shot in quick succession. The structured light image is used to speed up a photogrammetric correlation between the two images by guiding the feature recognition.

As the aim of the methods disclosed herein is to obtain highly accurate data, it is preferable that a sub-sea survey vehicle be moving reasonably slowly while implementing the methods disclosed herein. Additional calculations may be carried out to compensate for any movement of the vehicle while carrying out the method, based on telemetry data. However, by correct choice of lighting and sensors, it is also possible for high-speed motion. This is achieved by ensuring short exposure times and low motion blur.

The methods for generating 3D point cloud data described herein are not limited to use underwater. While the methods and systems described herein are aimed primarily for use in underwater survey vehicles, such as ROVs and AUVs, and stationary sub-sea sentry systems, the present teaching is not limited thereto. For example, the methods and systems described herein may also be used, on a suitably sized support vehicle, to perform a survey inside a pipeline, flow line or the like. It is known to flush such vessels with a bolus of water as part of maintenance action known as "pigging". By loading a submersible module adapted to comprise the systems described herein or to use the methods described herein into the bolus of water, a survey of the inside of the pipe may be carried out as the water and submersible module move through the pipe. Such an internal pipe survey may comprise AUV type operation, that is without a tether. Similarly, the methods and systems described herein may be used for downhole imaging and measurement. A downhole survey may be operated with a submersible module attached to a tether such that some or all of the survey data can be transmitted back to the surface as the survey is carried out. Alternatively, the submersible module may be mechanically placed with the option of storing data locally on the camera. The methods of the present disclosure may be configured to be performed in pipelines, subsea structures, horizontal flowlines, vertical risers, or subsea production and processing equipment. Further, the method may be configured to be performed for an internal well bore survey at high speed using full resolution single or dual sensors, laser and pulsed lighting.

It will be recognised that where more than one laser source is used in the methods and systems disclosed herein, they need not be identical in colour or power and may be modulated to best match the environmental conditions.

The 3D Cartesian coordinates generated by the methods disclosed herein are relative to an origin in the vicinity of the camera modules, however for display on a map, it may be necessary to translate those coordinates to refer to the vehicle navigation origin for the survey vehicle in question.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments.

The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method for generating a 3D point cloud and color visualization of an underwater scene, the point cloud comprising a set of (x, y, z) coordinates relating to points in the scene, the method operating in a system comprising at least one camera module, at least one structured light source, and a processing module, each of the at least one camera module being directed at the scene and having substantially the same overlapped field of view; the method comprising:
    (a) the at least one structured light source projecting a two-dimensional array of points onto the scene;
    (b) each of the at least one camera module capturing an image of the projected array in the scene from first and second positions, such that there is a first point image and second point image;
    (c) analyzing the images to identify the location of each projected point within each point image;
    (d) for each projected point in the captured point images, correlating the location of the point between the first and second point images to calculate the distance to the point from the at least one camera module;
    (e) storing the distance and location of the point;
    (f) adjusting the position of the two-dimensional array of points in the scene; and repeating (a) to (e), thereby forming the 3D point cloud,
    wherein the system further comprises a white light source, the method further comprising:
    projecting the white light on to the scene in sequence following a structured light acquisition;
    each camera acquiring a white light image; and
    combining the 3D point cloud and white light images to provide a 3D color visualization of the scene.

2. A method for generating a 3D point cloud and color visualization of an underwater scene, the point cloud comprising a set of (x, y, z) coordinates relating to points in the scene, the method operating in a system comprising at least one camera module, at least one structured light source, and a processing module, each of the at least one camera module being directed at the scene and having substantially the same overlapped field of view; the method comprising:
    (a) the at least one structured light source projecting a two-dimensional array of points onto the scene;
    (b) each of the at least one camera module capturing an image of the projected array in the scene from first and second positions, such that there is a first point image and second point image;
    (c) analyzing the images to identify the location of each projected point within each point image;
    (d) for each projected point in the captured point images, correlating the location of the point between the first and second point images to calculate the distance to the point from the at least one camera module;
    (e) storing the distance and location of the point;
    (f) adjusting the position of the two-dimensional array of points in the scene; and repeating (a) to (e), thereby forming the 3D point cloud;
    wherein the system further comprises a plurality of light sources controllable to provide a plurality of illumination profiles; the method comprising:
    illuminating the scene according to a while light profile;
    each camera module simultaneously capturing an image of the illuminated scene, such that there is a first scene image and second scene image;
    using machine vision to analyze the images to identify at least one feature within each scene image;

comparing features between scene images to identify features that appear in both scene images;

identifying the locations of points in features that appear in both scene images;

correlating the location of the features points between the first and second scene images to calculate the distance to the feature points from the at least one camera module; and storing the distance and location of the feature points.

3. A method as claimed in claim 1, wherein the at least one camera module comprises a single camera, the method comprising positioning the single camera at a first location, acquiring images and position data at the first location, followed by moving the single camera to a second location, and acquiring images and position data at the second location.

4. A method as claimed in claim 1, wherein the at least one camera module comprises a pair of cameras.

5. A method as claimed in claim 4, wherein the pair of cameras are separated by a distance greater than inter-ocular distance.

6. A method as claimed in claim 4, wherein each of the pair of cameras simultaneously capture an image of the projected array in the scene from the first and second positions.

7. A method as claimed in claim 1, wherein the two-dimensional array of points comprises a grid or checkerboard.

8. A method of generating a 3D point cloud of an underwater scene, the point cloud comprising a set of three variable Cartesian coordinates relating to surface points in the scene, the coordinates being defined in relation to an origin, the method operating in a system comprising a time-of-flight laser ranging device, a beam adjustor, a camera module and a controller, the method comprising:

the time-of-flight laser ranging device measuring the range to a point in the scene by projecting a laser beam onto that point;

recording a range timestamp associated with that range measurement;

the camera module capturing an image of the laser beam projected onto the scene, recording an image id associated with the captured image;

analysing the image to identify a horizontal and vertical coordinate of the laser beam in the image, combining the range measurement with horizontal and vertical coordinates having an image time stamp that matches the range time stamp of the range measurement so as to form a three variable Cartesian coordinate; and adjusting the location of the projected laser beam; and repeating the steps above.

9. A method as claimed in claim 1, being configured to be performed in one of pipelines, subsea structures, horizontal flowlines, vertical risers, and subsea production and processing equipment.

10. A method as claimed in claim 1, being configured to be performed for an internal well bore survey at high speed using full resolution single or dual sensors, laser and pulsed lighting.

* * * * *